US005302804A

United States Patent [19]

McGee et al.

[11] Patent Number: 5,302,804

[45] Date of Patent: Apr. 12, 1994

[54] GAS ARC CONSTRICTION FOR PLASMA ARC WELDING

[75] Inventors: William F. McGee, Decatur; Daniel J. Rybicki, Huntsville, both of Ala.

[73] Assignee: The United States of America as represented by the Administrator of the National Aeronautics and Space Administration, Washington, D.C.

[21] Appl. No.: 81,890

[22] Filed: Jun. 25, 1993

[51] Int. Cl.[5] ........................ B23K 10/00; B23K 9/167

[52] U.S. Cl. .................................. 219/121.51; 219/75; 219/121.5; 219/121.48

[58] Field of Search ....................... 219/121.480, 121.5, 219/121.51, 121.49, 121.59, 74, 75

[56] References Cited

U.S. PATENT DOCUMENTS

| | | | |
|---|---|---|---|
| 4,125,754 | 11/1978 | Wasserman et al. | 219/121.5 |
| 4,389,559 | 6/1983 | Rotolico et al. | 219/121.5 |
| 4,762,977 | 8/1988 | Browning | 219/121.47 |
| 5,194,715 | 3/1993 | Severance, Jr. et al. | 219/121.48 |
| 5,233,154 | 8/1993 | Horai et al. | 219/121.48 |

*Primary Examiner*—Mark H. Paschall

*Attorney, Agent, or Firm*—Robert L. Broad, Jr.; Guy M. Miller; John R. Manning

[57] ABSTRACT

A welding torch for plasma arc welding apparatus has an inert gas applied circumferentially about the arc column externally of the constricting nozzle so as to apply a constricting force on the arc after it has exited the nozzle orifice and downstream of the auxiliary shielding gas. The constricting inert gas is supplied to a plenum chamber about the body of the torch and exits through a series of circumferentially disposed orifices in an annular wall forming a closure at the forward end of the constricting gas plenum chamber. The constricting force of the circumferential gas flow about the arc concentrates and focuses the arc column into a more narrow and dense column of energy after exiting the nozzle orifice so that the arc better retains its energy density prior to contacting the workpiece.

2 Claims, 1 Drawing Sheet

GAS ARC CONSTRICTION FOR PLASMA ARC WELDING

ORIGIN OF THE INVENTION

The invention described herein was made in performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION (1) Field of the Invention

This invention relates to plasma arc welding (PAW), and more particularly to plasma arc welding apparatus wherein an external constricting force is applied to the arc column to concentrate and focus it to maintain a dense column of energy.

(2) Description of Related Art

Plasma arc welding is a process wherein coalescence of metals is produced by heating them with a constricted arc between a nonconsumable refractory electrode and the work or between the electrode and a constricting nozzle having an orifice. A filler metal may or may not be added during the process. Thus, plasma arc welding is a method of electrical arc welding in a protective gas atmosphere wherein the arc is maintained between the workpiece and a nonconsumable electrode of a high melting point metal such as tungsten, the plasma of the arc being passed through a nozzle. The electrode is disposed within and insulated from a welding torch body and a front end having the constricting nozzle. An inert gas is supplied to the torch body and is channeled about the electrode exiting through the orifice. This gas acts upon the electric arc to constrict its shape to that of a narrow column and becomes ionized in the arc to form the plasma. In addition the orifice gas provides some shielding effect to the molten weld zone and the electrode and acts on the arc to constrict its shape and shield the weld. In most, if not substantially all cases, an auxiliary shielding gas is provided by channeling a second inert gas stream to blanket the area of arc plasma impingement on the workpiece to avoid contamination of the weld pool. An example of plasma arc welding apparatus is illustrated in U.S. Pat. No. 3,612,807.

One of the main advantages of the plasma arc is the directional stability and focusing effect brought about by arc constriction. This constriction narrows the arc column into an extremely dense energy source. However, upon exiting the orifice, the arc column begins to flare and become larger in diameter due to the absence of a constricting mechanism. This effects a decrease in the energy density of the arc prior to contacting the workpiece and thus reduces the effectiveness and efficiency of the process.

SUMMARY OF THE INVENTION

It is a primary object of the present invention to provide apparatus for constricting the arc column exiting the nozzle of plasma arc welding apparatus to harness the energy from the electric arc more effectively than in the prior art.

It is another object of the present invention to provide a constricting force upon the arc exiting from the orifice of the constricting nozzle of plasma arc welding apparatus so as to maintain the energy density of the arc column after the arc exits the orifice.

It is a further object of the present invention to provide plasma arc welding apparatus wherein an inert gas is applied circumferentially to externally constrict the arc after it has exited the orifice of the constricting nozzle so as to concentrate and focus the arc column as it exits the orifice.

Accordingly, the present invention provides a method and apparatus for providing an external constricting force on the arc exiting the orifice of the nozzle of plasma arc welding torch to retain the energy density of the arc column after the arc exits the nozzle to maximize the energy available for contacting a workpiece. The constricting force is provided by applying an inert gas circumferentially about the arc to concentrate and focus the arc column after it leaves the nozzle. This prevents the diameter of the arc column from expanding or flaring after leaving the nozzle, and maintains or even narrows the diameter to that a more narrow weld bead and heat zone is created. Additionally, a symmetrical dimensional shape of the arc is maintained which alleviates asymmetrical weld bead shapes and related defects which now occur with conventional plasma arc welding apparatus.

To provide a circumferential flow of inert gas about the arc, the invention provides an arc constricting gas flow circumferentially about the shielding gas and the arc, i.e., circumferentially about the shielding gas nozzle and the constricting nozzle. The constricting gas is directed upon the arc externally of the constricting nozzle orifice through a plurality of circumferentially disposed spaced apart orifices. Preferably the constricting gas flows from a supply conduit into a circumferentially disposed plenum about the shielding gas nozzle and, the outer wall of the latter may form the inner wall of the constricting gas supply plenum.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
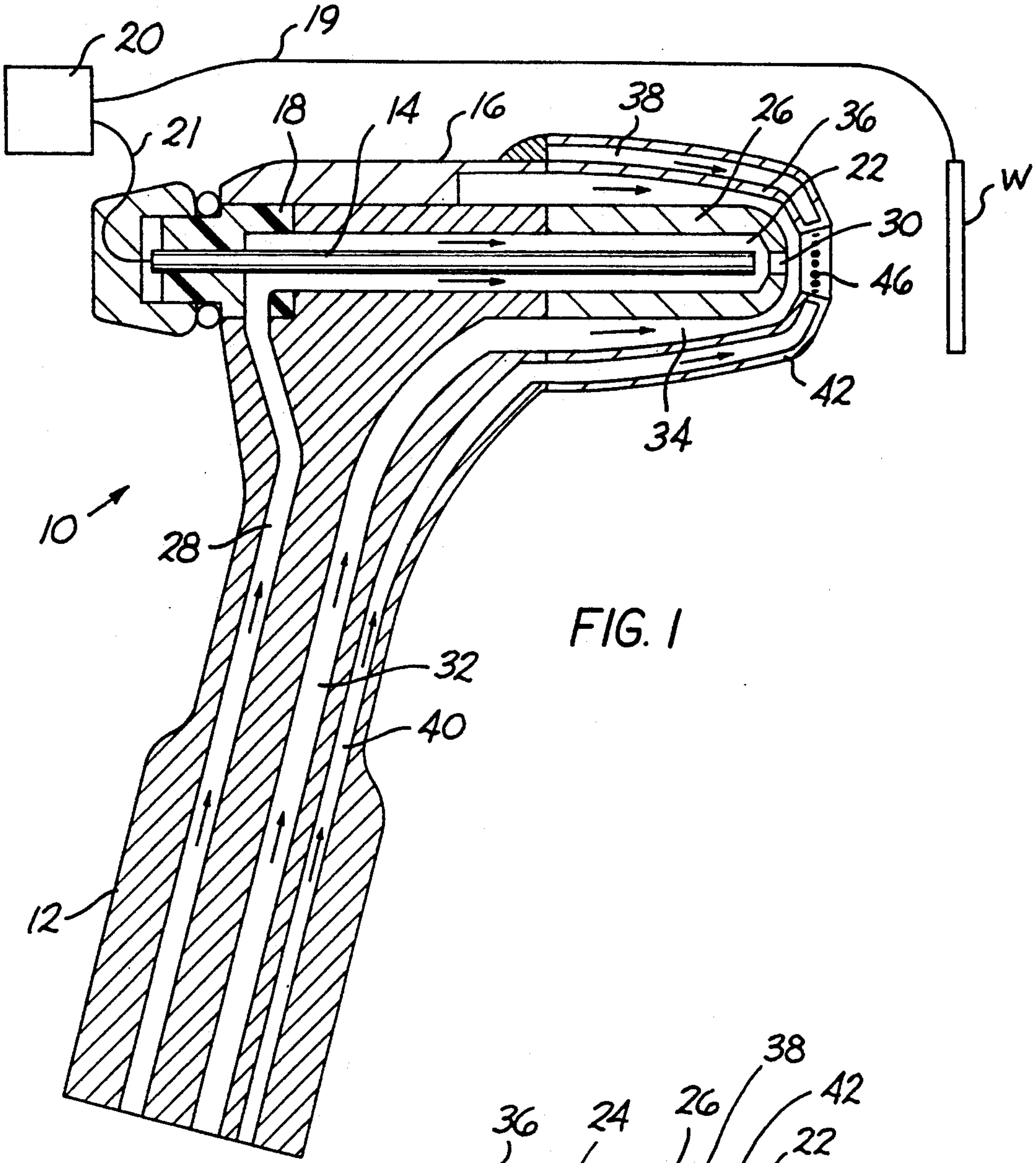
FIG. 1 is a cross sectional view of a manual plasma arc welding torch head incorporating constricting gas supply apparatus constructed in accordance with the principles of the present invention.

Referring to the drawings, a typical manual plasma arc welding torch 10 incorporating the principles of the present invention is illustrated in FIG. 1, the torch having a handle 12 for holding by an operator. Torches for mechanized and automated plasma arc welding apparatus are similar to manual torches except for the handle portion and are intended to be included within the scope of the present invention.

Figure 2:
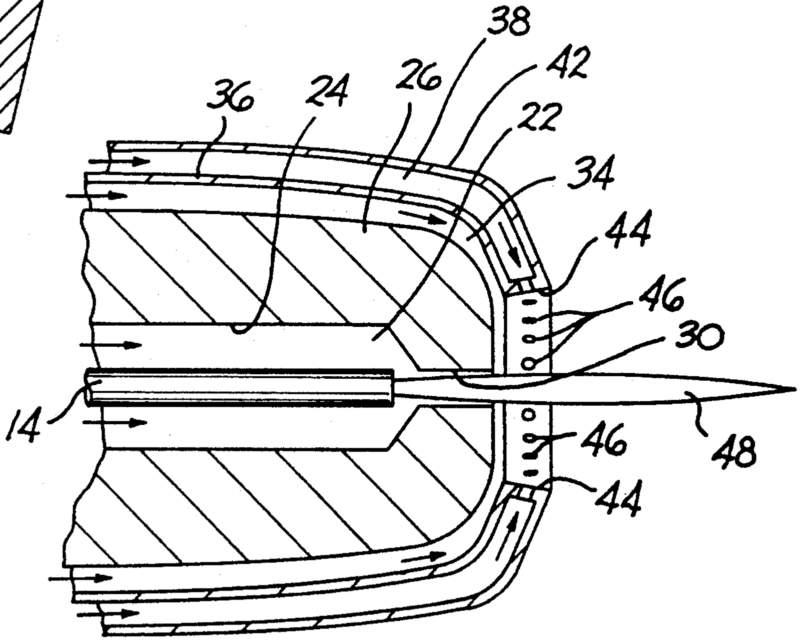
FIG. 2 is an enlarged cross sectional view of the outlet end of the torch illustrated in FIG. 1.

The torch 10 includes a high temperature melting point electrode 14, such as tungsten, secured within the body or head 16 of the torch by means of an insulated collet 18 so that the electrode is insulated from the body. Electrical power, either alternating current or direct current, may be supplied from a source 20 through electrical leads 19, 21 between the workpiece W and the electrode as is conventional. A plenum chamber 22, as best illustrated in FIG. 2 is formed within the torch head spaced between the electrode 14 and the inside wall 24 of a constricting nozzle body 26, generally formed from copper alloy. The plenum chamber communicates with a passageway 28 extending through the body of the torch and the handle 12. An inert gas such as argon is supplied to the passageway 28 and flows into the plenum chamber 22 about the electrode to provide a protecting atmosphere and exits the nozzle body 26 through a small orifice 30 in the front of the electrode. As the orifice gas passes through the plenum chamber, 22 it is heated by the arc, expands and exits through the nozzle orifice 30 at an accelerated rate. The arc is columnated into an extremely dense energy source and focused by the constricting nozzle on a relatively small area of the workpiece W. This gas, known as the orifice gas, supplies the necessary atmosphere for allowing electrical transfer of the arc across the gap between the electrode and the workpiece, and becomes ionized in the arc to form the plasma which issues from the orifice as the plasma jet.

Another passageway 32 is formed within the torch body 16 and the handle 12 and communicates with a chamber 34 formed between the nozzle body 26 and an outer wall or cup 36. The passageway 32 is supplied with a shielding gas, which may be an inert gas, such as argon, to blanket the area of arc plasma impingement upon the workpiece to provide a total inert atmosphere at the weld zone to prevent contamination. However, the shielding gas does not constrict the arc column so that after the arc column issues from the orifice 30 it becomes larger in diameter and, as it does, the energy density is reduced prior to contact with the workpiece. Although not illustrated, a coolant such as water may be circulated through the torch to cool and dissipate the heat generated in the constricting nozzle.

In order to prevent or reduce the tendency of the arc from enlarging in diameter after it has exited the nozzle orifice 30 which, as aforesaid, decreases the energy density of the arc, the present invention provides an external constricting force on the arc downstream of the orifice. To this end an arc constricting inert gas such as argon, is directed circumferentially about the arc externally of the nozzle orifice. Thus, an additional plenum chamber 38 is formed about the torch body externally of the shielding gas chamber 34 and communicates with a passageway 40 formed within the torch body 16 and the handle 12, the passageway 40 receiving the inert gas.

The plenum chamber 38 may be formed between the wall or cup 36 about the shielding gas plenum 34 and an additional external wall or cup 42. The forward ends of the cups 36 and 42 are disposed forwardly of the nozzle 26 and are directed radially inwardly relative to the center of the torch, i.e., toward the axis of the orifice 30 and terminate in a circumferentially extending joining wall 44 spaced radially from the axis of the orifice 30, the wall 44 providing a closure for the plenum chamber 38. Formed within the circumferential wall 44 and communicating with the plenum chamber 38 are a plurality of spaced apart apertures or orifices 46 which direct the gas within the chamber 38 to impinge upon the arc 48. By controlling the pressure and flow of gas through the constricting gas plenum chamber 38, and by proper sizing of the orifices 46, the velocity of the gas and thus the force applied on the arc may be controlled to forcibly constrict the arc into a narrow dense column and retain the density of the arc column after exiting the nozzle orifice 30.

Consequently, the invention more efficiently harnesses the energy of the arc than conventional plasma arc welding apparatus and permits a narrower weld bead and heat effected zone. Additionally, the narrower denser arc column aids in maintaining symmetry to the dimensional shape of the arc alleviating asymmetrical weld bead shapes and related defects. This latter advantage may result in a reduction or elimination of the need for torch rotation during the welding process and result in the process being less operator dependent.

Numerous alterations of the structure herein disclosed will suggest themselves to those skilled in the art. For example, the invention may be applied to gas tungsten arc welding apparatus which conventionally has no arc constructing mechanism. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A plasma gas arc welding torch, comprising
   a. an annular nozzle body having a first orifice in a front end of the body and an axially extending first plenum chamber formed within said nozzle body in communication with said orifice, said first orifice having an axis,
   b. an axially extending electrode disposed within said chamber in alignment with said first orifice,
   c. means connected to the electrode for supplying electricity to the.electrode to form an arc extending from the electrode through the first orifice to a workpiece positioned in front of the torch,
   d. a second plenum chamber formed by and between a pair of spaced inner and outer cups surrounding the forward end of the nozzle body, said cups having forward ends extending beyond the forward end of the nozzle body, the forward ends of the cups being directed radially inward toward the axis of the orifice and terminating in a circumferentially extending joining wall, said wall facing and being spaced from the axis of the orifice, said wall being provided with a plurality of spaced second orifices, said cups being spaced from the nozzle body to form a third plenum chamber between the nozzle body and the inner cup, said third plenum chamber having an annular third orifice surrounding the first orifice, said torch having therein a first passageway for feeding an inert gas to the first plenum chamber to form a plasma exiting from said nozzle through said first orifice, said torch having a third passageway for feeding an inert gas through the third plenum chamber to exit from the third orifice and form a column of blanketing gas surrounding said plasma, said torch having a second passageway for feeding an inert gas through the second plenum chamber to exit through said second orifices in the joining wall and impinge on the column of gas to constrict said column of gas.

2. In a welding torch as recited in claim 1, wherein said first orifice has a smaller cross sectional area than said first plenum chamber, whereby inert gas exiting from said first orifice increases in velocity.

* * * * *